Dec. 14, 1943.      G. L. MOELLER      2,336,697
FAN BALANCING MEANS
Filed Oct. 3, 1940
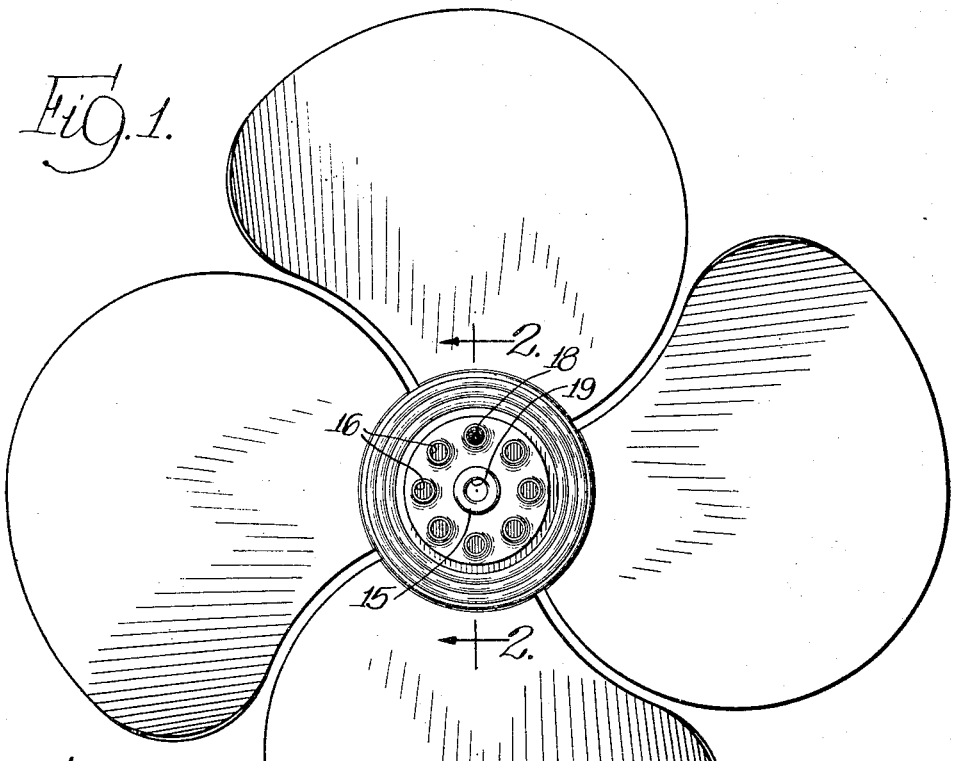
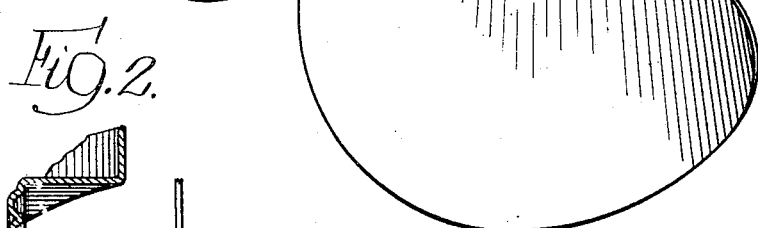
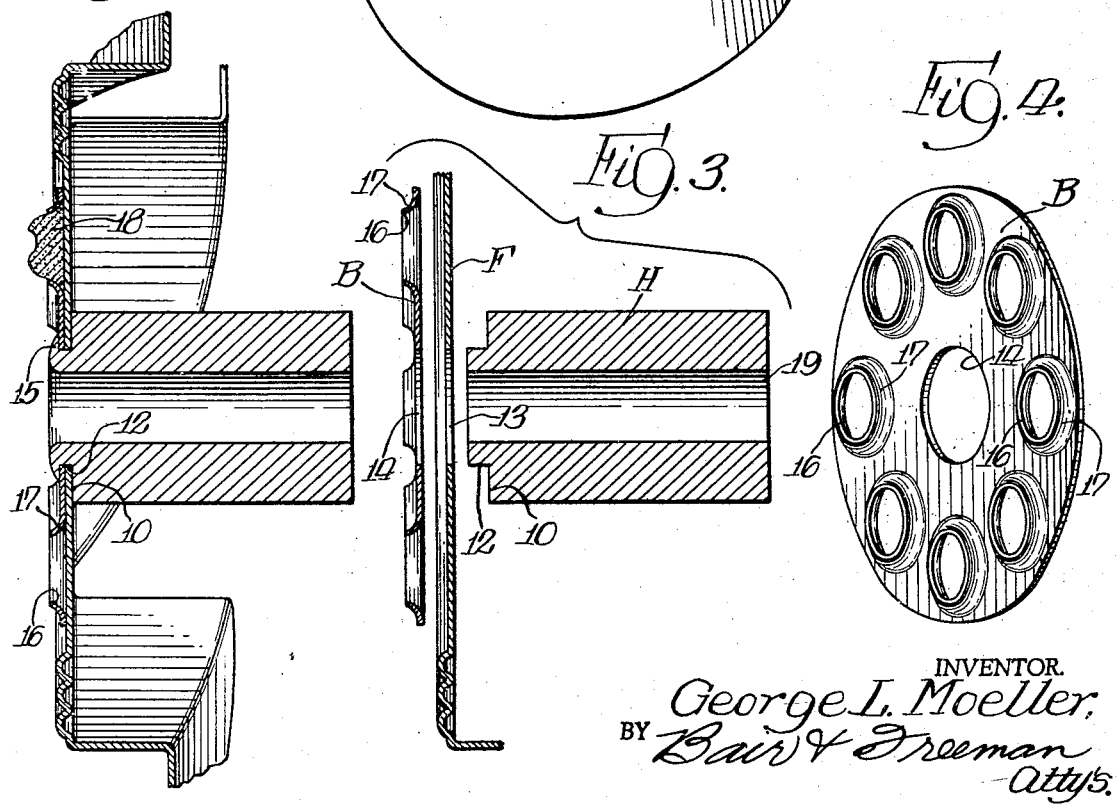
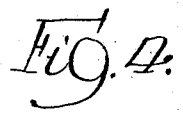
INVENTOR.
George L. Moeller,
BY Bair & Freeman
Attys.

UNITED STATES PATENT OFFICE 2,336,697

FAN BALANCING MEANS

George L. Moeller, St. Louis, Mo., assignor to Knapp-Monarch Company, St. Louis, Mo., a corporation of Missouri Application October 3, 1940, Serial No. 359,562

4 Claims. (Cl. 170—159)

My present invention relates to a balancing means for fans whereby a slug of solder or soft metal or the like may be attached to a fan blade on its light side as determined by supporting a shaft for the fan blade or knife edges or by a dynamic balancing process.

One object of the invention is to provide a balancing means which is very simple and inexpensive to construct and easy to assemble on the fan.

Another object is to provide a balancing means which is adapted to receive a slug of solder or soft metal in such manner as to retain the slug against subsequent dislocation.

Still a further object is to provide a balancing means consisting of a disc with a series of countersunk openings arranged annularly and equidistantly spaced from the center of rotation, the openings being adapted to receive and confine a slug of counterbalancing metal which may be either forced or melted into place and retained without the use of fastening means such as bolts or screws.

Other objects, purposes and characteristic features of the present invention will be in part obvious from the accompanying drawing and in part pointed out as the description of the invention progresses. In describing the invention in detail, reference will be made to the accompaning drawing in which like reference characters designate corresponding parts throughcut the several views, and in which:

Figure 1 is a front elevation of a fan having balancing means embodying my invention applied thereto.

Figure 2 is an enlarged sectional view on the line 2—2 of Figure 1.

Figure 3 is a separated sectional view of the parts of the structure.

Figure 4 is a perspective view of the specific balancing disc constituting my invention.

On the accompanying drawing I have used the reference characters H to indicate a hub, F to indicate a fan blade disc and B a balancing disc.

The hub H has a shoulder 10 and a reduced portion 12. The discs F and B are provided with central openings 13 and 14. The reduced portion 12 of the hub H is adapted to extend through the openings 13 and 14 when the parts are assembled as in Figure 2 with the disc F resting against the shoulder 10. The discs F and B are then in face to face relation and are retained assembled by peening over the marginal end of the reduced portion 12 as indicated at 15.

The balancing disc B has an annular series of openings 16 preferably equidistantly spaced from the center of rotation of the disc. The edges of the openings 16 as indicated at 17 are countersunk or pressed to a cone shape with the base of the cone in each instance facing the front of the fan blade disc F.

One of the countersunk openings 16 is adapted to receive a slug 18 of solder or suitable soft metal placed in position after determining which is the lightest side of the fan blade structure. Two methods now in common use for determining this question are: 1. By inserting a shaft through the bore 19 of the hub H and supporting the shaft on knife edges so that the heavy side of the assembly will by gravity seek a position vertically below the shaft; or: 2. Determining by the dynamic balancing method which is the lightest side of the assembly.

The opening 16 corresponding to the lightest side is then filled with the slug 18 either by soldering the slug into position (the disc B being preferably tinned for this purpose) or pressing it into position, which can be accomplished with a slug of soft metal. The soldering or melting operation is preferred as the slug then bonds with the balancing disc B and is thus retained against any subsequent looseness.

If the slug 18 is too heavy it can readily be partially drilled out or carved away until the structure is in perfect balance. In the event that the lightest point determined by the knife edge or dynamic balancing methods occurs between two of the openings 16, then both of them may receive a slug 18 and the sizes of the slugs may vary depending on whether the lightest point is closest to one opening or the other.

Thus I provide a simple and readily operable means to receive a balancing slug without the necessity of drilling away portions of the fan structure or attaching by bolts or screws counterbalancing weights at various points.

Having described one specific embodiment of my invention together with the operation thereof, I desire it to be understood that this form is selected merely for the purpose of facilitating disclosure of the invention rather than for the purpose of limiting the number of forms which it may assume. It is to be further understood that various modifications, adaptations and alterations may be applied to the specific form disclosed to meet the requirements of practice without in any manner departing from the spirit and scope of the present invention except as set forth in the claims appended hereto.

I claim as my invention and desire to secure by Letters Patent of the United States:

1. In combination, a hub, a fan blade disc and a balancing disc, said discs being secured to said hub in face to face relation, said balancing disc having an annular series of countersunk openings spaced from the center of the balancing disc with the countersunk sides of said openings toward said fan blade disc and a slug of soft metal larger than and located in one of said openings and thereby confined in position between said discs.

2. In combination, a fan blade disc and a balancing disc, said discs being secured face to face with relation to each other, said balancing disc having an annular series of cone segment shaped openings therein and a slug of soft metal larger than and located in one of said openings and retained in position between said discs by the bases of the cones arranged adjacent said fan blade disc.

3. A fan, a fan hub, and fan balancing means comprising a disc secured to said hub, said disc having an annular series of openings greater in number than the number of fan blades and spaced from the center of rotation of said fan hub, a slug of solder which may be readily trimmed down to lessen its weight after installation, said slug being selectively received in said openings, said openings having conical-shaped edges with the bases of the openings toward the fan.

4. In combination, a hub, a fan blade disc, and a balancing disc adjacent said fan blade disc, said balancing disc being provided with openings at annular spaced points around the center of rotation of said hub, a slug of soft metal between said fan blade disc and said balancing disc at one of said openings and having a base larger than the opening, whereby said slug partially projects through the opening and is retained by the edge thereof against dislocation from between said discs and said opening permitting projection of said slug to a position for trimming it to reduce its weight.

GEORGE L. MOELLER.